Patented Jan. 9, 1940

2,186,773

UNITED STATES PATENT OFFICE 2,186,773

2(P - NICOTINYLAMINOBENZENESULFON-
AMIDE) PYRIDINE AND ITS SALTS, AND
PROCESS OF PREPARING THEM

Elmer H. Stuart, Indianapolis, Ind., assignor to
Eli Lilly and Company, Indianapolis, Ind., a
corporation of Indiana No Drawing. Application August 11, 1939,
Serial No. 289,696

6 Claims. (Cl. 260—295)

My invention relates to a new compound of nicotinic acid with sulfapyridine [2(p-aminobenzene-sulfonamide)-pyridine], and its salts, and to the process of preparing it.

My new compound is found to have a marked protective effect against certain infections; most particularly streptococcal infections, and to some extent pneumococcal infections.

My new compound is 2(p-nicotinylaminobenzene-sulfonamide)-pyridine, or nicotinyl sulfapyridine, and has the following formula:

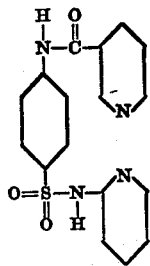

(1)

It is obtained in the form of white crystals, which melt at about 261° C. It is substantially insoluble in cold water, cold alcohol, and acetone; but is soluble in boiling glacial acetic acid and in boiling cyclohexanol, and very slightly soluble in boiling water and in boiling alcohol. Its sodium salt is relatively soluble in water and in alcohol, and insoluble in ether; and decomposes at about 275° C. It forms both mono- and di-hydrochlorides, both of which are of light lemon-yellow color. Its mono-hydrochloride is very slightly soluble in water, and melts at about 148° C. Its di-hydrochloride is soluble in water; but the second hydrochloric-acid group is apparently rather loosely bound, for it can be washed off with absolute alcohol to produce the relatively water-insoluble mono-hydrochloride. The di-hydrochloride shrinks at about 115° C., melts at about 128° C., and decomposes by giving off gas bubbles at about 140°–145° C. All the temperatures given are corrected temperatures.

The fundamental process of preparing my new product is to react sulfapyridine [2(p-aminobenzene-sulfonamide)-pyridine] with a nicotinyl chloride, desirably nicotinyl chloride hydrochloride. That general reaction may be carried out in any suitable way, but my preferred procedure is as follows:

I first obtain (or prepare) nicotinyl chloride hydrochloride; which is the compound resulting from the reaction of nicotinic acid and thionyl chloride. This reaction and the product obtained thereby have already been reported, and the reaction is said (Berichte, Vol. 59, page 1479, 1926) to be as follows:

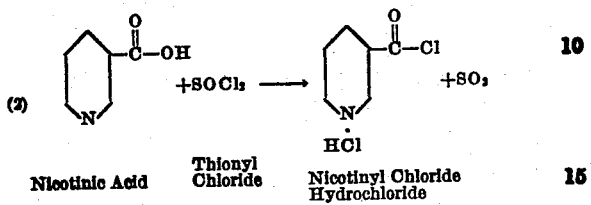

(2)

Nicotinic Acid  Thionyl Chloride  Nicotinyl Chloride Hydrochloride

The nicotinyl chloride hydrochloride thus prepared may be made to react with sulfapyridine in any suitable manner, to produce the desired nicotinyl sulfapyridine or its hydrochlorides. Although I believe that it is not necessary, I prefer to produce the reaction under conditions in which the temperature may be controlled and is kept fairly low, and the speed of the reaction is not too great. To that end, I deem it desirable to conduct the reaction without having present any additional base, such as sodium bicarbonate or sodium hydroxide; although if desired such an additional base may be present. I also prefer to mix the reactants in a dry state, and to produce no solution of either until after the mixture has been made.

My preferred process is as follows:

I grind together substantially molecular proportions of nicotinyl chloride hydrochloride and of sulfapyridine, in dry state. After mixing is complete, I add ice water, desirably of not over 5° C. The amount of water is not critical, but I find it convenient to use about 250 cc. of water per gram-molecule of either of the reacting materials. It is desirable to allow the whole to stand over night, or longer, preferably in the cold. A reaction slowly occurs when the water is added, but by the use of cold water the heat of reaction is dissipated and I am able thereby to get a good yield of the desired final product, in the form of its soluble di-hydrochloride if no alkalinizing agent is present, with relatively little decomposition products.

The reaction, if nicotinyl chloride hydrochloride is used, is probably as follows:

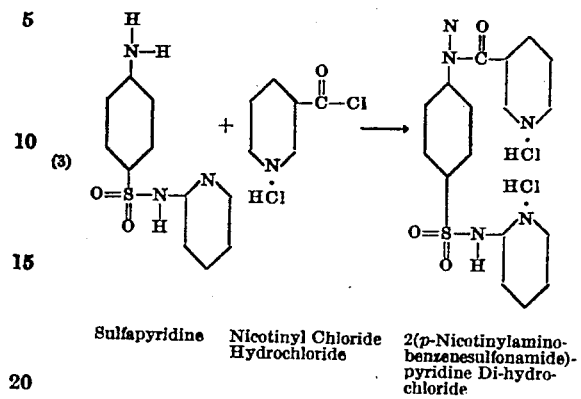

Sulfapyridine   Nicotinyl Chloride Hydrochloride   2(p-Nicotinylamino-benzenesulfonamide)-pyridine Di-hydrochloride In the course of this reaction, if nicotinyl chloride hydrochloride is used and no alkalinizing agent is present, there may be and usually is partial or complete solution of the reaction materials in the water; and the final product that is produced remains in solution in the water. If desired, the solution may be subjected to filtration to remove any co-present solid impurities; but that is ordinarily not necessary.

After the whole mass has stood overnight, I add an alkalinizing agent, such as sodium bicarbonate or sodium hydroxide, to produce a hydrogen ion concentration of about pH7; although exact neutralization is not necessary. This substantial neutralization of the acid solution causes the precipitation of the desired 2(p-nicotinyl-aminobenzenesulfonamide) - pyridine, together with any unreacted sulfapyridine; and this precipitate is suitably separated, as by filtering or centrifuging. To purify the desired product, and to get rid of any co-present unreacted sulfapyridine, I extract the mass with hot absolute alcohol, and then with boiling water, which solvents dissolve the unreacted sulfapyridine and the greater part of any other co-present impurities; and after each extraction filter while hot to recover the undissolved 2(p-nicotinylaminobenzenesulfonamide)-pyridine. If further purification is desired, this final product may be dissolved in water containing some sodium hydroxide, to form a solution of the sodium salt; and the solution thus formed treated with a decolorizing carbon, filtered to remove the carbon, and then acidified, as with acetic acid, to precipitate the 2(p - nicotinylaminobenzenesulfonamide) - pyridine, which may be recovered by filtration and dried at low temperature.

The following is a quantitative example of the preferred procedure for making my new 2(p-nicotinylaminobenzenesulfonamide)-pyridine:

Example: A flask containing 2000 cc. of thionyl chloride is cooled in a cold-water bath, and 900 grams of nicotinic acid are slowly added to it while it is kept cold. The mixture is refluxed on a water bath for three hours; and then allowed to stand overnight at room temperature. In the morning the supernatant liquid is removed, as by evaporation under vacuum, to obtain crystals of nicotinyl chloride hydrochloride, which weigh about 1450 g.

75 g. of these crystals of nicotinyl chloride hydrochloride are ground up with 100 g. of sulfapyridine; and to this mixture is added all at once about 400 cc. of water at about 5° C. The whole is mixed for about one hour. Then the mixture is allowed to stand overnight, desirably in the refrigerator although it is sufficient if it is done at room temperature. In the morning the solution is filtered to remove any insoluble material, such as unreacted sulfapyridine. The filtrate is neutralized slowly, most conveniently with a solution of sodium hydroxide, until no more precipitate is formed; and is then filtered, and the precipitate recovered and dried. This precipitate weighs about 64 g.

This precipitate is extracted twice with 400 cc. lots of boiling alcohol, at least the first of which is absolute alcohol, and then once with 2500 cc. of boiling distilled water. The final residue weighs about 40 g. This purification procedure involves some loss of my new final product, for it is somewhat soluble both in hot alcohol and in hot water; but it is much less soluble in those solvents than is sulfapyridine.

The final product as so purified has the properties already outlined. It forms salts, usually soluble salts, with both strong acids and bases; such as hydrochloric acid, sulfuric acid, hydriodic acid, nitric acid, and various sulfonic acids among the acids, and the alkali metals, the alkaline-earth metals, the lower-alkyl amines, such as methylamine and ethylamine, the lower-alkanol amines, such as monoethanol amine, and the lower diamines, such as ethyl-diamine, among the bases. Thus it is soluble in water acidulated with hydrochloric or sulfuric acid to form the hydrochloride or the sulfate in solution, and is soluble in water made alkaline with sodium hydroxide or sodium carbonate to form the sodium salt.

I claim as my invention:
1. The new compound, 2(p-nicotinylaminobenzenesulfonamide)-pyridine, or nicotinyl sulfapyridine, which has the following formula:

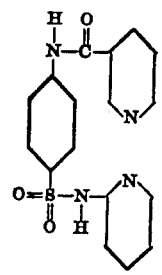

and its salts.

2. The process of producing 2(p-nicotinyl-aminobenzenesulfonamide)-pyridine, which consists in reacting 2(p-aminobenzenesulfonamide)-pyridine with a nicotinyl chloride.

3. The process of producing 2(p-nicotinyl-aminobenzenesulfonamide)-pyridine, which consists in reacting 2(p-aminobenzenesulfonamide)-pyridine with nicotinyl chloride hydrochloride to produce   2(p - nicotinylaminobenzenesulfonamide)-pyridine hydrochloride, and neutralizing the hydrochloric acid therein.

4. The process of producing 2(p-nicotinylaminobenzenesulfonamide)-pyridine hydrochloride, which consists in reacting 2(p-aminobenzenesulfonamide)-pyridine with nicotinyl chloride hydrochloride to produce 2(p-nicotinylaminobenzenesulfonamide)-pyridine hydrochloride.

5. The process of producing a salt of 2(p-nicotinylaminobenzenesulfonamide)-pyridine, which consists in reacting 2(p-aminobenzenesulfonamide)-pyridine with nicotinyl chloride hydrochloride to produce 2(p-nicotinylaminobenzenesulfonamide)-pyridine hydrochloride, neutralizing the hydrochloric acid therein, and adding a base to form the desired salt.

6. The process of producing a salt of 2(p-nicotinylaminobenzenesulfonamide)-pyridine, which consists in reacting 2(p-aminobenzenesulfonamide)-pyridine with nicotinyl chloride hydrochloride to produce 2(p-nicotinylaminobenzenesulfonamide)-pyridine hydrochloride, neutralizing the hydrochloric acid therein, and adding a strong acid to form the desired salt.

ELMER H. STUART.